United States Patent [19]
Brock

[11] Patent Number: 5,835,807
[45] Date of Patent: Nov. 10, 1998

[54] HOLDER FOR CAMCORDER AND CAMERA FOR USE WITH MICROSCOPE

[76] Inventor: Dennis Brock, 1430 Pelican Bay Trail, Winter Park, Fla. 32792

[21] Appl. No.: 960,833

[22] Filed: Oct. 30, 1997

Related U.S. Application Data

[60] Provisional application No. 60/037,045, Feb. 3, 1997.

[51] Int. Cl.[6] .................................................. G03B 17/24
[52] U.S. Cl. .......................... 396/419; 248/167; 396/432
[58] Field of Search ..................... 396/419, 428, 396/429, 432; 248/165, 166, 167, 188, 460, 463, 464

[56] References Cited

U.S. PATENT DOCUMENTS

| | | |
|---|---|---|
| 827,338 | 7/1906 | Whitlow ................................. 248/166 |
| 3,228,283 | 1/1966 | Fulton et al. . |
| 3,514,206 | 5/1970 | Harvey et al. . |
| 3,531,197 | 9/1970 | King . |
| 3,669,539 | 6/1972 | Okuyama . |
| 4,601,565 | 7/1986 | Fisher . |
| 4,621,785 | 11/1986 | Embra . |
| 4,728,974 | 3/1988 | Nio et al. . |
| 5,028,941 | 7/1991 | Sohn . |
| 5,058,842 | 10/1991 | Zemlin et al. . |
| 5,152,491 | 10/1992 | Forster et al. .......................... 248/460 |
| 5,285,226 | 2/1994 | Frosig et al. . |
| 5,374,971 | 12/1994 | Clapp et al. . |
| 5,448,319 | 9/1995 | Uzawa . |

*Primary Examiner*—David M. Gray
*Attorney, Agent, or Firm*—Caesar, Rivise, Bernstein, Cohen & Pokotilow, Ltd.

[57] ABSTRACT

A collapsible holder for a camcorder or camera for use with a microscope or for use as a copystand in general.

7 Claims, 4 Drawing Sheets

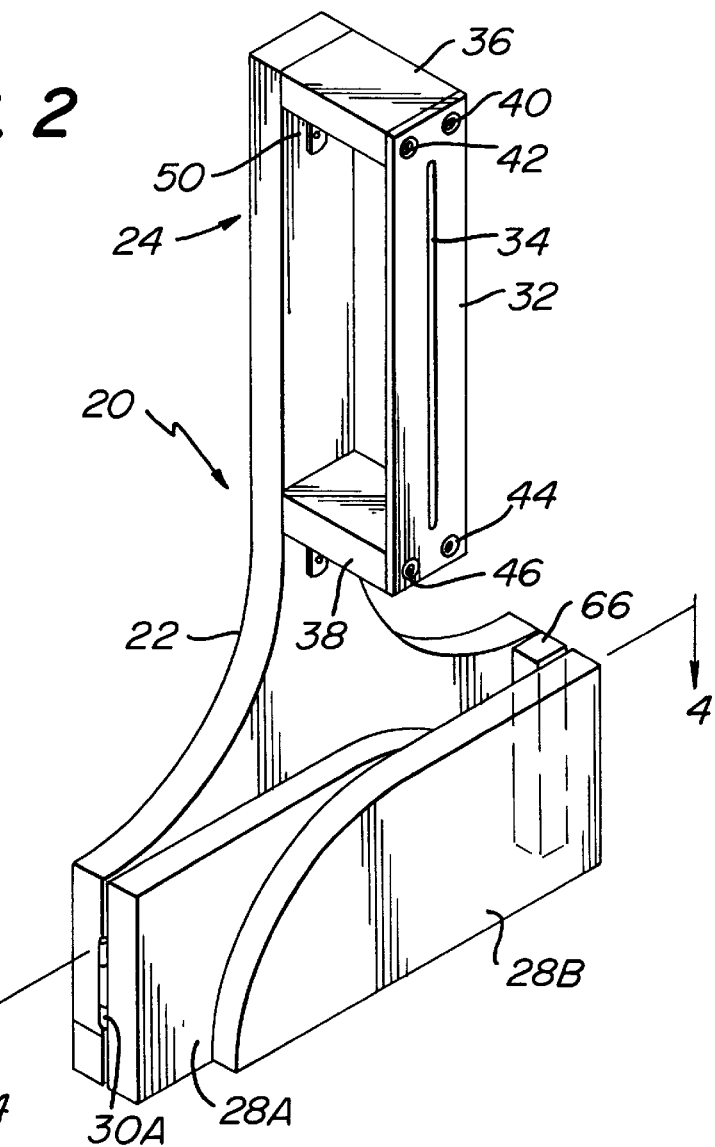
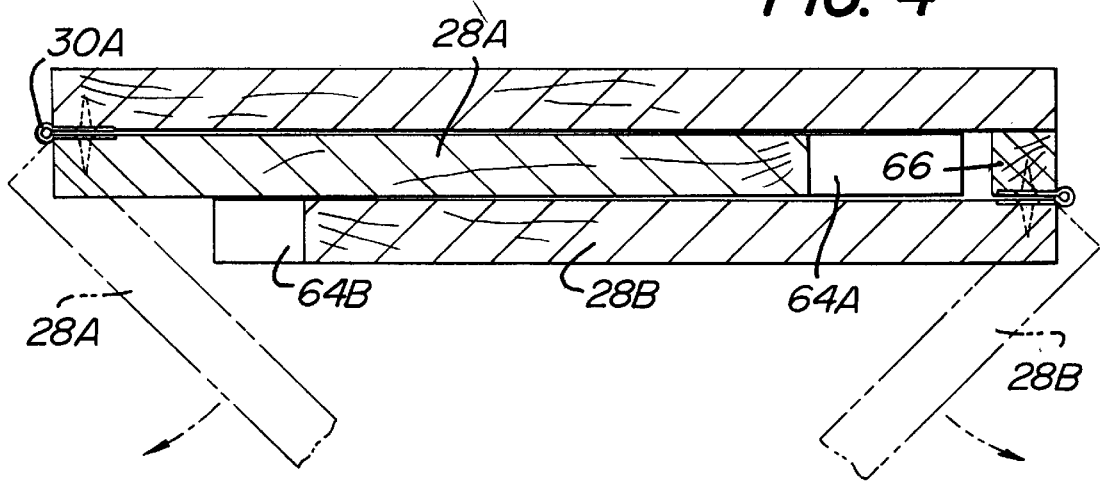

HOLDER FOR CAMCORDER AND CAMERA FOR USE WITH MICROSCOPE

RELATED APPLICATIONS

This is a utility application based upon provisional patent application Ser. No. 60/037,045, filed Feb. 3, 1997, entitled HOLDER FOR CAMCORDER AND CAMERA FOR USE WITH MICROSCOPE. Applicant hereby incorporates the entire subject matter of the '045 provisional application into this utility application and also claims the benefit of the filing date of the '045 provisional application for this utility application.

BACKGROUND OF THE INVENTION

The present invention has as its principal objective holding a camcorder or camera when used with a microscope. The present invention is thus primarily concerned with holding a camcorder and camera in place when used with a microscope.

The following U.S. patents relate to camera or camcorder copystands:

U.S. Pat. No. 3,228,283 (Fulton et al.) discloses a partially-collapsible camera support assembly that comprises a U-shaped base portion, an upstanding support member and a camera mounted to the upper end of the support member. However, there is also no means for adjusting the vertical height of the camera-mounting portion.

U.S. Pat. No. 3,514,206 (Harvey et al.) discloses a partially-collapsible photographic stand that includes a frame and side portions, a base portion and a camera-mounting portion. However, there is no means for adjusting the vertical height of the camera-mounting portion and the side portions are fixedly secured to the base portion.

U.S. Pat. No. 3,531,197 (King) discloses a photographic copystand that permits the vertical adjustment of a camera mounted above the item to be photographed. However, this stand is not collapsible.

U.S. Pat. No. 3,669,539 (Okuyama) discloses a microfilm camera having a fixed horizontal base adapted to receive an object to be photographed and a vertically-mobile lens, that is movable along a fixed optical axis. A camera body is located above the lens with means provided for moving the body horizontally, transverse of the optical axis. Also means are provided for advancing a film roll in a film plane above an aperture in line with the optical axis.

U.S. Pat. No. 4,601,565 (Fisher) discloses an adaptor device for mounting a 35 mm camera on a copy camera of the type having an open back over which a film holder is normally mounted so that a bellows extension and lenses of the copy camera can be used for extreme close-up photography with the 35 mm camera and film.

U.S. Pat. No. 4,621,785 (Embra) discloses a vibration damping camera mount. The mount comprises a frame and preferably two parallel guides extending therefrom. A support tube extends in the same direction as the guides and carries a camera platform on its upper end. A bracket connects the support tube and guides such that the support tube and attached platform can slide in relation to the guides, while being prevented from moving laterally.

U.S. Pat. No. 4,728,974 (Nio et al.) discloses an apparatus for supporting an imaging device such as a fiber scope for use in connection with a robot wrist while minimizing any interference between an object to be worked on and the optical system monitoring the object.

U.S. Pat. No. 5,028,941 (Sohn) discloses a telescoping rigid locator that is releasably secured to the bottom side of a video camera that is held by the user. The telescoping portion is extended downward, along the viewing axis until its tip contacts the surface on which the object being videotaped is encountered. The telescoped portion is then locked at that position and thus videotaping can be accomplished for precise and close-spaced relation with the object being videotaped.

U.S. Pat. No. 5,058,842 (Zemlin et al.) discloses a low torque device for tilting platforms. A TV or movie camera can be disposed therein and the vertical direction of the field of view can be varied.

U.S. Pat. No. 5,285,226 (Frosig et al.) discloses a photographic copy stand for supporting a camera. The stand comprises a continuous sheet of paper board that is adapted to be folded to form a generally tubular section for surrounding the subject to be photographed. The tubular section includes reflectors for illuminating the subject area from multiple directions.

U.S. Pat. No. 5,374,971 (Clapp et al.) discloses a camera stand for directing a video camera at, alternately, a room scene and a document scene where the document in the document scene is oriented to be read by a person seated in the room scene. The apparatus uses a support arm and a rotatable connection for connecting the video camera to, and supporting the video camera at, the supporting end of the arm.

U.S. Pat. No. 5,448,319 (Uzawa) discloses an optical system for monitoring cameras to be mounted on vehicles. The optical system includes a vertically-oriented support that can be mounted on a front portion or a rear portion of a vehicle. The support houses a photographic lens system having a light receiving surface which is disposed at an imaging location of the photographic lens system and directed perpendicularly to a longitudinal direction of the support.

Thus, there remains a need for a collapsible and stowable apparatus for holding a camcorder or camera that permits the vertical adjustment of the camcorder's or camera's height above a microscope or above an object being videotaped or photographed in general.

OBJECTS OF THE INVENTION

Accordingly, it is the general object of this invention to provide an apparatus which addresses the aforementioned needs. It is an object of this invention to provide an improved mechanism for holding a camcorder/camera in place when used with a microscope.

It is another object of this invention to provide an improved mechanism for holding a camcorder/camera in place videotaping or photographing an object placed on a surface.

It is still another object of this invention to provide an improved mechanism for holding a camcorder/camera in place that can be easily folded up and stowed away.

It is even yet another object of this invention to provide an improved mechanism for holding a camcorder/camera in place that can accommodate auxiliary lighting in the vicinity of the object being videotaped or photographed.

It is a further object of this invention to provide an improved mechanism for holding a camcorder/camera in place that can accommodate auxiliary lighting for illuminating a fiber optic illuminator of a microscope.

It is yet another object of this invention to provide an improved mechanism for holding a camcorder/camera in place that includes a light-blocking disk to be disposed at the optical tube of a microscope for filtering out extraneous light during recording or photographing.

Other objects and advantages of the present invention will be apparent and suggest themselves to those skilled in the art from a reading of the following specifications and claims, taken in conjunction with the accompanying drawings.

SUMMARY OF THE INVENTION

These and other objects of this invention are achieved by providing a foldable device stand comprising a main member having an elongated section and a transverse base section defining a common plane and wherein the base section has first and a second side. The foldable device stand further comprises a first member pivotally coupled to the first side and a second member pivotally coupled to the second side. The first member and the second member permit the main member to be stabilized in an upright position on a flat surface whenever the first member and the second member are pivoted in a plane other than the common plane. The foldable device stand further comprises a slotted surface coupled to the elongated section. The slotted surface is aligned with, and offset from, the elongated section. The slotted surface permits a device (e.g., a camcorder or camera) to be releasably coupled to the slotted surface at a desired height above the flat surface.

DESCRIPTION OF THE DRAWINGS

Other objects and many of the advantages of this invention will be readily appreciated as the same becomes better understood by reference to the following detailed description when considered in connection with the accompanying drawings wherein:

FIG. 2 is an isometric view of the present invention shown in a folded condition for storage.

FIG. 4 is a cross sectional view of the present invention taken along line 4—4 of FIG. 2.

DESCRIPTION OF THE PREFERRED EMBODIMENT OF THE INVENTION

Figure 1:
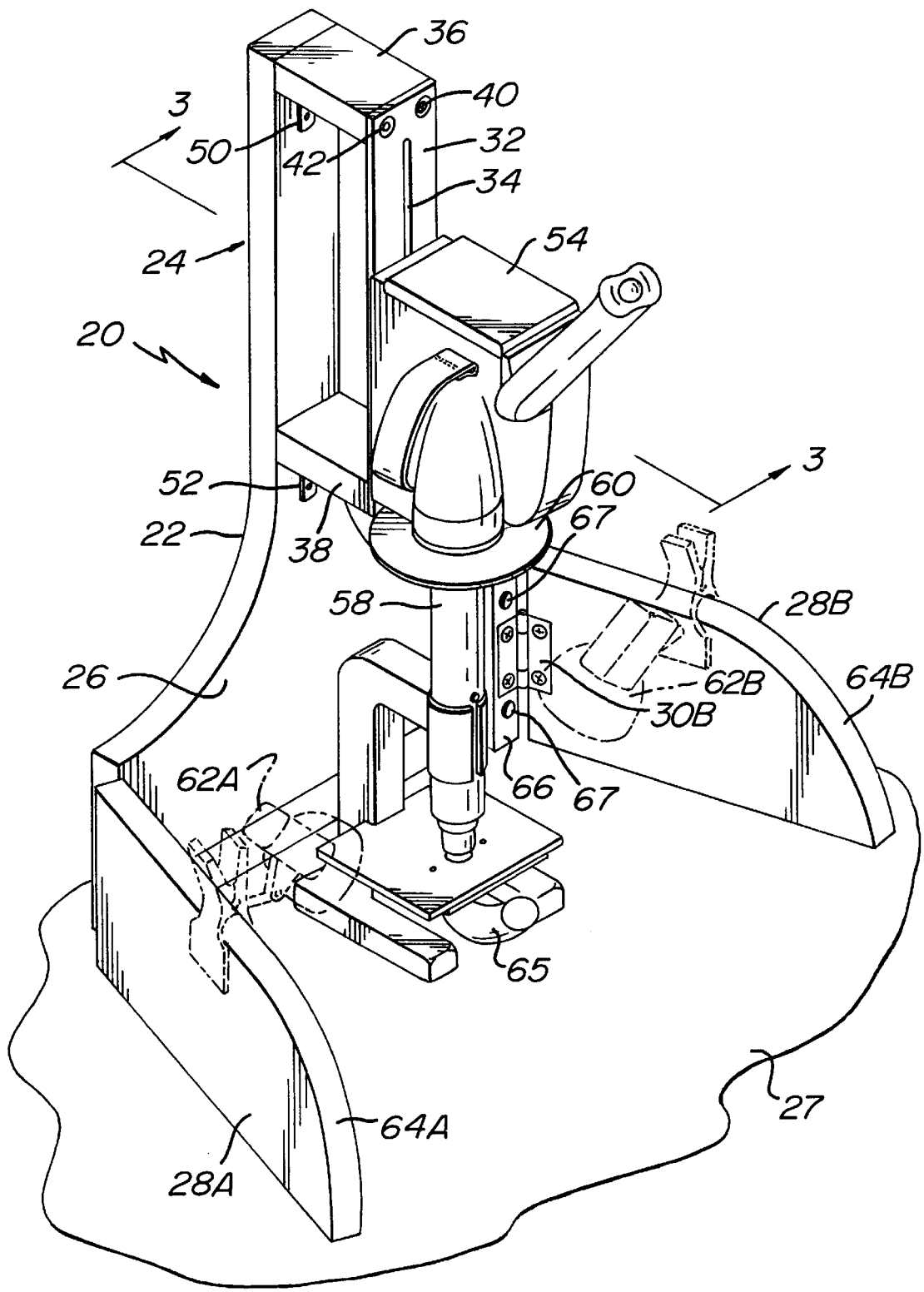
FIG. 1 is an isometric view of the present invention in use with a camcorder and a microscope.

Referring now in greater detail to the various figures of the drawing wherein like reference characters refer to like parts, a camcorder/camera holder (hereinafter "CCH") constructed in accordance with the present invention is shown generally at 20 in FIG. 1.

The CCH 20 comprises a main member 22, having a neck 24 and base portion 26, that stands upright when the CCH 20 is in use on a flat surface 27. A pair of wing supports 28A and 28B are pivotally coupled to respective sides of the base portion 26 by respective hinges 30A and 30B and stabilize the CCH 20 on the flat surface 27 when they are pivoted away, out of the plane of the base portion 26.

A surface 32 having a vertically-oriented slot 34 is aligned with, and offset from, the neck 24 by offset struts 36 and 38. The surface 32 is fixedly coupled to these offset struts 36 and 38 (e.g., screws 40–46). The offset struts 36 and 38 are, in turn, fixedly secured to the neck 24 (e.g., right-angle mounts 50 and 52 as shown most clearly in FIG. 3).

Figure 3:
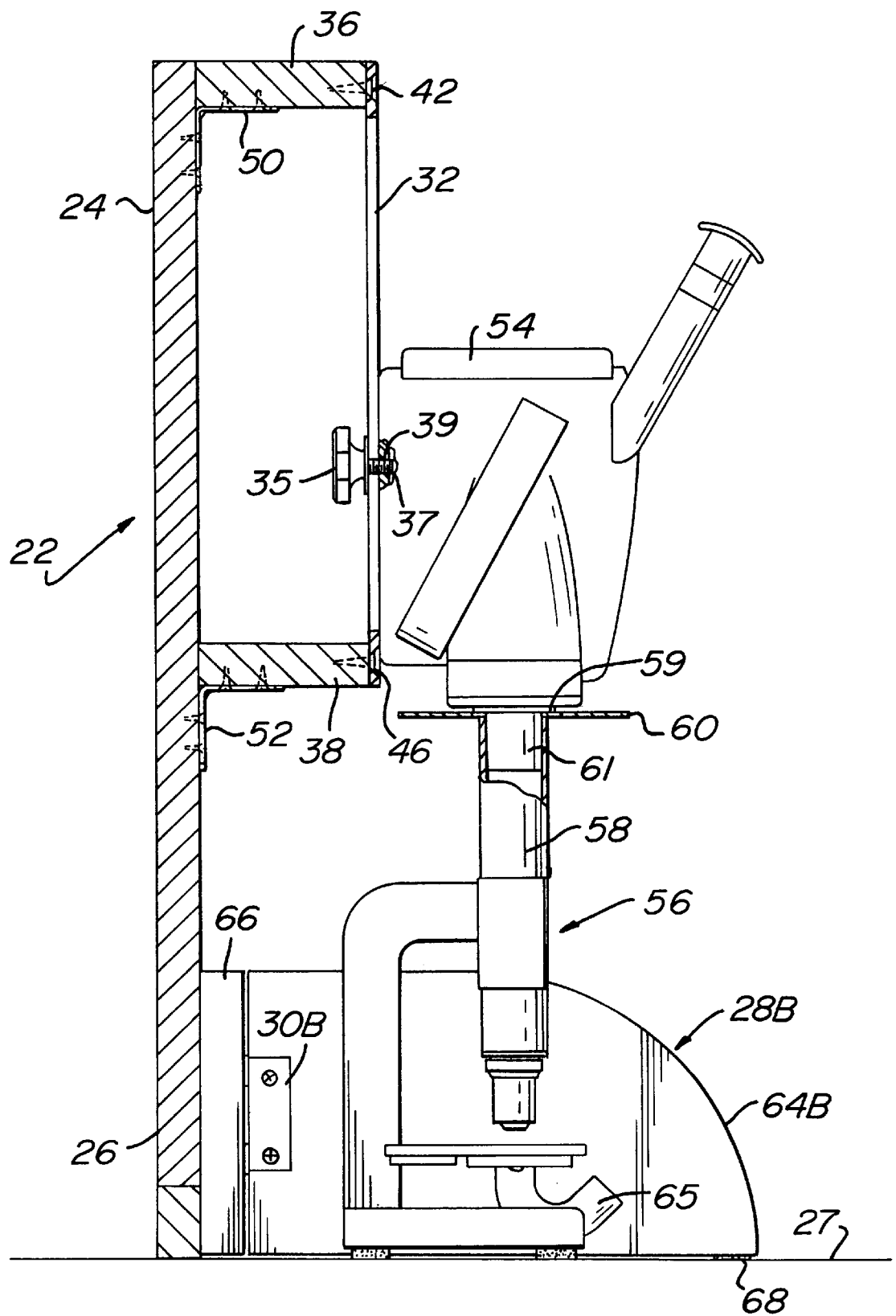
FIG. 3 is a side view of the present invention taken along lines 3—3 of FIG. 1.

As shown most clearly in FIG. 3, the slot 34 permits a tripod mount knob 35 from any conventional tripod for use with a camcorder 54, (or, e.g., a camera or digital camera, neither of which is shown) to be inserted and then adjusted to any desired vertical height along the slot 34. In particular, the tripod mount knob 35 comprises a threaded portion 37 that passes through the slot 34 and is received into a threaded sleeve 39 in the bottom of the camcorder 54 (camera or digital camera); once the desired height is found, the tripod mount knob 35 is tightened against the surface 32, thereby releasably securing the camcorder 54 (or camera or digital camera) at the desired height.

The preferred use of the CCH 20 is with a microscope 56, such as the one disclosed in U.S. Pat. No. 5,071,241 (Brock), for recording views through the optical tube 58 of the microscope 56. In particular, as shown in FIG. 1, the microscope 56 is placed on the flat surface 27, and the CCH 20 is positioned so that the neck 24 is aligned with, and just behind, the optical tube 58. The wing supports 28A and 28B are pivoted to form a three-sided enclosure around the microscope 56.

To assist in filtering out extraneous light during recording, a light-blocking disk 60 having a hole (not shown) in the center is disposed on top of the optical tube 58. In particular, as shown most clearly in FIG. 3, the light-blocking disk 60 is trapped between a lip 59 of an insertable eyepiece 61 and the top of the optical tube 58; the insertable eyepiece 61 passes through the hole in the disk 60 and fits snugly within the optical tube 58. The camcorder 54 (or camera) is then positioned closely adjacent the eyepiece 61.

Supplemental lighting can be added to the CCH 20 as shown in FIG. 1. In particular, attachable lamps 62A and 62B (shown in phantom) can be coupled to the respective wing supports 28A and 28B to enhance the lighting at the microscope 56. Furthermore, the wing supports 28A and 28B can even be pivoted inward slightly toward the base portion 26, as shown in FIG. 5, to facilitate the lighting at the microscope 56.

Figure 5:
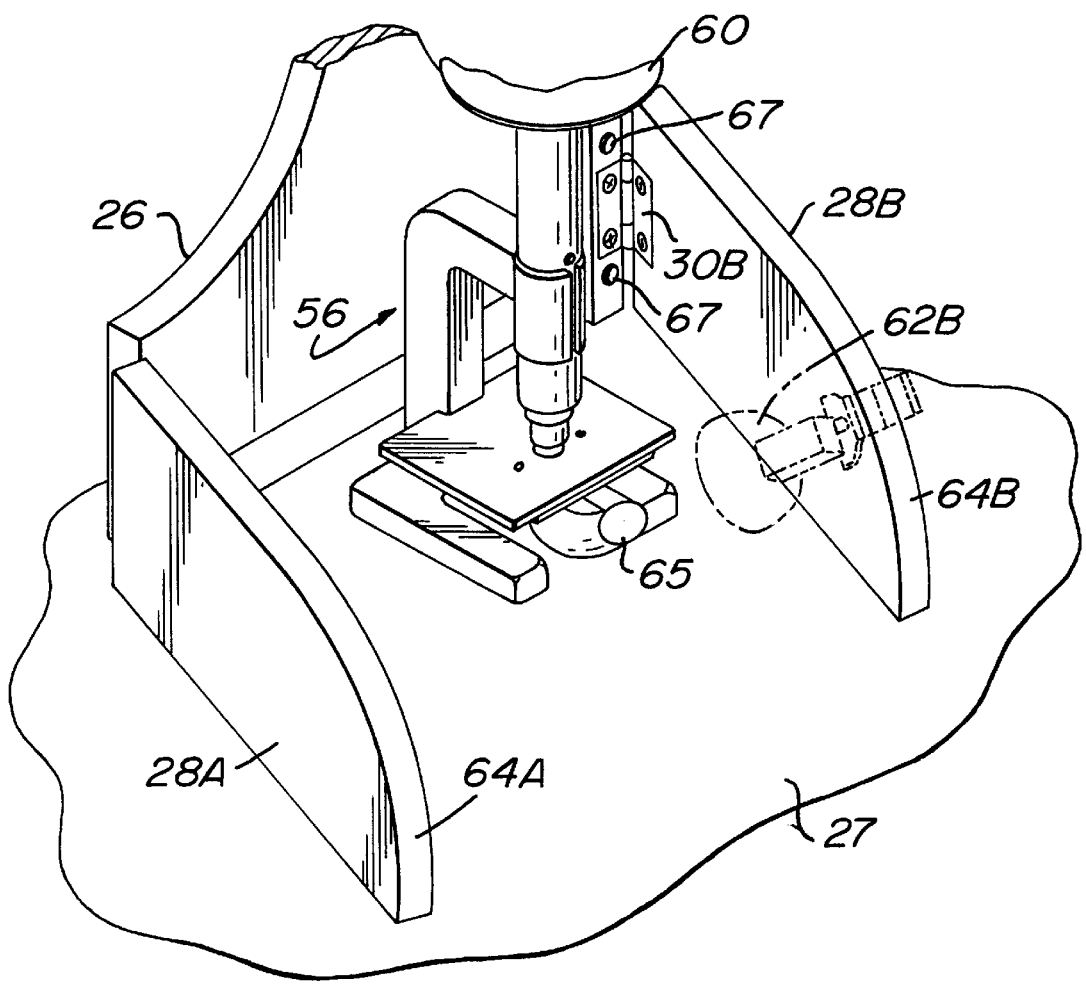
FIG. 5 is an isometric view of the present invention showing one of the wig supports pivoted inward to direct light into a fiber optic illuminator underneath the microscope.

In addition, as shown in FIG. 5, the attachable lamps 62A/62B (only one 62B of which is shown) can be coupled to the wing supports 28A/28B along their respective curved edges 64A and 64B and then the wing supports 28A/28B (or even just one of them) can be pivoted slightly inward so that their light is directed into a fiber optic illuminator 65, thereby permitting "transmitted light" operation of the microscope 56 as opposed to "reflected light" operation of the microscope 56 described previously.

An offset hinge block 66 (FIG. 2) is fixedly secured (e.g., nails 67, screws, etc.) to one side of the base portion 26. This block 66 permits the hinge 30B to be a conventional standard hinge, thereby allowing the wing support 28B to rest squarely against wing support 28A when the CCH 20 is folded. The folding feature of the CCH 20 permits it to be conveniently stowed away, e.g., in a desk drawer.

A foot 68 (only one of which is shown in FIG. 3) can be coupled to the wing supports 28A/28B to provide an offset for any play in the hinges 30A/30B.

The main member 22 and the wing supports 28A/28B may comprise any durable lightweight material such as wood or aluminum. The vertical surface 32 may comprise a durable material such as aluminum, e.g., an aluminum rail having a thickness of approximately $3/16"$, preferably $1/4"$. Use of the $1/4"$ rail not only improves rigidity but it permits the use of standard $1/4"\times20"\times1/2"$ tripod mount knobs 35 without the need to include washers when tightening the tripod mount knobs 35 against the surface 32 for securing the camcorder 54 or camera.

It is within the broadest scope of this invention to include other applications of the CCH 20 in addition to applications with microscopes. For example, the CCH 20 can be used as a copystand, in conjunction with a light table, or other applications where it is necessary to position something over a confined work area on a horizontal surface while supplementing that same area with adjustable lighting schemes.

Without further elaboration, the foregoing will so fully illustrate my invention that others may, by applying current or future knowledge, readily adopt the same for use under various conditions of service.

I claim:

1. A foldable device stand comprising:
    a main member having an elongated section and a transverse base section defining a common plane, said base section having a first and a second side;
    a first member pivotally coupled to said first side and a second member pivotally coupled to said second side, said first member and said second member permitting said main member to be stabilized in an upright position on a flat surface whenever said first member and said second member are pivoted in a plane other than said common plane; and
    a slotted surface rigidly fixed to said elongated section, said slotted surface being both longitudinally aligned with and transversely offset from said elongated section, said slotted surface permitting a device to be releasably coupled to said slotted surface at a desired height above the flat surface.

2. The foldable device stand of claim 1 wherein said first member pivotally coupled to said first side is pivotally coupled to said first side by a hinge.

3. The foldable device stand of claim 1 wherein said second side comprises an offset hinge block and wherein said second member pivotally coupled to said second side is pivotally coupled to said offset hinge block by a hinge.

4. The foldable device stand of claim 1 wherein said first member and said second member are adapted to accommodate supplemental lighting thereon.

5. The foldable device stand of claim 1 wherein said slotted surface comprises a slot that is adapted to accommodate tripod mount knobs for releasably securing the device to said slotted surface.

6. The foldable device stand of claim 2 wherein said first member comprises a foot that rests on the flat surface for offsetting any play in the hinge.

7. The foldable device stand of claim 3 wherein said second member comprises a foot that rests on the flat surface for offsetting any play in the hinge.

* * * * *